United States Patent Office 3,336,284
Patented Aug. 15, 1967

3,336,284
CHLOROQUINOXALINE AZO DYESTUFFS CONTAINING A SECONDARY ω-AMINOALKYL GROUP
Horst Jäger, Cologne-Muelheim, and Edgar Siegel and Rudolf Schröter, Leverkusen, Germany, assignors to Farbenfabriken Bayer Aktiengesellschaft, Leverkusen, Germany, a corporation of Germany
No Drawing. Filed Sept. 14, 1964, Ser. No. 396,362
Claims priority, application Germany, Sept. 12, 1963, F 40,742
8 Claims. (Cl. 260—154)

The invention concerns novel reactive azo dyestuffs wherein a heterocyclic reactive group is linked to the dyestuff via a secondary ω-amino-alkyl group attached to the nucleus; in their broadest aspect they correspond to the general formula

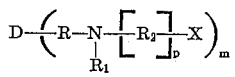

wherein the radical D denotes the radical of a metal-free or metal-containing mono- or disazo dyestuff, R is an alkylene group, preferably of low molecular weight having 1 to 3 carbon atoms attached to a nucleus of D, such as —$CH_2$— or

$R_1$ is the radical —$C_nH_{2n+1}$ where $n$ represents integers of 1 to 4, $R_2$ is —OC— or —$O_2S$— and X is a heterocyclic reactive group; $m$ denotes an integer of 1-3 and $p$ is 0 or 1. In this connection, the term "reactive group" applies to those groupings which can enter into homopolar bonds with the hydroxy groups of cellulose-containing materials under the influence of substances which discharge alkali. The formation of a homopolar bond can occur when the reactive group contains a substituent which can be discharged as an anion, for instance a labile halogen atom, which is exchanged for the cellulose anion. The heterocyclic radical X which contains the labile substituent or substituents or groupings may be linked directly to $R_2$, or in the case where $p=0$ it may be linked to

when $p=1$, the bonding of the heterocyclic radical X to $R_2$ may take place via condensed aromatic rings.

The following may be mentioned as examples from the large number of possible heterocyclic reactive groups $\{R_2\}_pX$: the 1,3-dichloro-sym.-triazinyl-5,
1-monochloro-sym.-triazinyl-5,
1-methyl-3-monochloro-sym.-triazinyl-5,
1-amino-3-monochloro-sym.-triazinyl-5,
1-methoxy- or 1-phenoxy-3-monochloro-sym.-triazinyl-5,
1-(2'-sulphophenylamino)-3-monochloro-sym.-triazinyl-5,
1-(3'-sulphophenylamino)-3-monochloro-sym.-triazinyl-5,
1-(4'-sulphophenylamino)-3-monochloro-sym.-triazinyl-5,
1-(2',5'-disulphophenylamino)-3-monochloro-sym.-triazinyl-5,
2,4-dichloropyrimidyl and trichloropyrimidyl group, also the 2,3-dichloroquinoxaline-6-carbonyl,
2,3-dichloroquinoxaline-6-sulphonyl,
2- or 3-monochloroquinoxaline-6-carbonyl,
2- or 3-monochloroquinoxaline-6-sulphonyl,
2,6-dichloropyrimidine-4-carbonyl,
2,4-dichloropyrimidine-5-sulphonyl,
1,4-dichlorophthalazine-6-carbonyl or -6-sulphonyl and
2-chloro-benzoxazole- or -benzthiazole-5-carbonyl- or -5-sulphonyl or -6-carbonyl or -6-sulphonyl group.

The simplest method for the preparation of the novel dyestuffs consists in that a metal-free or metal-containing mono- or disazo dyestuff which contains a secondary ω-amino-alkyl group attached to the nucleus, is reacted with a suitable heterocyclic component which contains at least two reactive radicals and is capable of introducing the radical $\{R_2\}_pX$; in general, this reaction is an acylation reaction which is preferably carried out in a neutral to weakly alkaline medium. For this purpose, the secondary ω-amino-alkyl group attached to the nucleus in the azo dyestuff may be present within the radical of the diazo component and/or within the radical of the coupling component. It is possible that the dyestuffs contains several groups of this type.

Acylating agents suitable for the reaction are for instance the acid halides, particularly the acid chlorides on which the above mentioned reactive radicals $\{R_2\}_pX$ are based, in other words for instance the trihalogenotriazines, dihalogenotriazines, tetra- or tri-halogenopyrimidines, 2,3-dihalogenoquinoxaline-6-carboxylic acid halides or 2,3-dihalogenoquinoxaline-6-sulphonic acid halides and 2- or 3-monohalogenoquinoxaline-6-sulphonic acid or -6-carboxylic acid halides, 1,4-phthalazine-6-carboxylic acid halides or -6-sulphonic acid halides, 2-halogeno-benzthiazole-5-carboxylic acid halides or -5-sulphonic acid halides, particularly their chlorides.

Diazo components suitable for the synthesis of the azo dyestuffs envisaged as the starting dyestuffs are amino-N-alkyl-benzylamines which may be further substituted at the aromatic nucleus, for instance by methyl, ethyl, phenyl, hydroxy, methoxy, ethoxy, phenoxy, mercapto, methylmercapto, carboxyl, cyano, sulphonic acid, nitro, optionally N-substituted sulphonamide, methylsulphone, ethylsulphone, methylamino or phenylamino groups and halogen atoms or other substituents usual in azo dyestuffs.

Special mention may for instance be made of the following compounds:

1-amino-4-benzyl-N-methylamine,
1-amino-4-benzyl-N-ethylamine,
1-amino-3-benzyl-N-methylamine,
1-amino-3-benzyl-N-ethylamine,
4-chloro-3-amino-1-benzyl-N-methylamine,
4-chloro-3-amino-1-benzyl-N-ethylamine,
4-chloro-3-amino-1-benzyl-N-propylamine,
4-chloro-3-amino-1-benzyl-N-butylamine,
4-chloro-3-amino-1-benzyl-N-isopropylamine,
4-hydroxy-3-amino-1-benzyl-N-methylamine,
4-methoxy-3-amino-1-benzyl-N-methylamine,
4-ethoxy-3-amino-1-benzyl-N-methylamine,
4-phenoxy-3-amino-1-benzyl-N-methylamine,
4-mercapto-3-amino-1-benzyl-N-methylamine,
4-methylmercapto-3-amino-1-benzyl-N-methylamine, 4-phenylmercapto-3-amino-1-benzyl-N-methylamine,
4-sulpho-3-amino-1-benzyl-N-methylamine,
4-sulphonamido-3-amino-1-benzyl-N-methylamine,
4-methylsulphonyl-3-amino-1-benzyl-N-methylamine,
4-carboxy-3-amino-1-benzyl-N-methylamine,
4-cyano-3-amino-1-benzyl-N-methylamine,
4-N-methanesulphonyl-N-methylamino-3-amino-1-benzyl-N-methylamine,
4-hydroxy-5-sulpho-3-amino-1-benzyl-N-methylamine,
4-hydroxy-5-sulphonamido-3-amino-1-benzyl-N-methylamine,
4-hydroxy-5-methylsulphonyl-3-amino-1-benzyl-N-methylamine,
4-methoxy-5-sulpho-3-amino-1-benzyl-N-methylamine,
2-chloro-5-amino-1-benzyl-N-methylamine,
2-methoxy-5-amino-1-benzyl-N-methylamine,
2-ethoxy-5-amino-1-benzyl-N-methylamine,
2-methylmercapto-5-amino-1-benzyl-N-methylamine,
2-sulpho-5-amino-1-benzyl-N-methylamine,
2-sulphonamido-5-amino-1-benzyl-N-methylamine,
2-methylsulphonyl-5-amino-1-benzyl-N-methylamine,
2-carboxy-5-amino-1-benzyl-N-methylamine,
2-cyano-5-amino-1-benzyl-N-methylamine,
2-methoxy-3-sulpho-5-amino-1-benzyl-N-methylamine,
2-chloro-6-amino-1-benzyl-N-methylamine,
2-chloro-6-amino-benzyl-N-ethylamine,
2-chloro-6-amino-benzyl-N-propylamine,
2-chloro-6-amino-benzyl-N-butylamine,
2-methoxy-6-amino-benzyl-N-methylamine,
2-sulpho-6-amino-benzyl-N-methylamine,
2-sulphonamido-6-amino-benzyl-N-methylamine,
2-methylsulphonyl-6-amino-benzyl-N-methylamine,
2-carboxy-6-amino-benzyl-N-methylamine,
2-cyano-6-amino-benzyl-N-methylamine,
2-sulpho-4-amino-1-benzyl-N-methylamine,
2-sulphonamido-4-amino-1-benzyl-N-methylamine and
2-methylsulphonyl-4-amino-1-benzyl-N-methylamine.

The azo components known for the production of azo dyestuffs can be considered as coupling components, provided that they are capable of coupling at the o- or p-position relative to a phenolic group or adjacent to an enolic hydroxy group or in the o-, adjacent or p-position relative to an amino group, particularly those from the phenol, naphthol, aminonaphthalene, aminobenzene, pyrazolone, aminopyrazole, barbituric acid and acylacetic acid amide series. The following may be mentioned as a selection from the large number of components which may be employed:

2-acetylamino-5-hydroxynaphthalene-7-sulphonic acid,
2-benzoylamino-5-hydroxynaphthalene-7-sulphonic acid,
2-sulpho-acetylamino-5-hydroxynaphthalene-7-sulphonic acid,
2-ureido-5-hydroxynaphthalene-7-sulphonic acid,
2-acetylamino-5-hydroxynaphthalene-1,7-disulphonic acid,
2-benzoylamino-5-hydroxynaphthalene-1,7-disulphonic acid,
2-ureido-5-hydroxynaphthalene-1,7-disulphonic acid,
1-acetylamino-8-hydroxynaphthalene-3,6-disulphonic acid,
1-benzoylamino-8-hydroxynaphthalene-3,6-disulphonic acid,
1-ethoxy-8-hydroxynaphthalene-3,6-disulphonic acid,
1-sulpho-acetylamino-8-hydroxynaphthalene-3,6-disulphonic acid,
1-acetylamino-8-hydroxynaphthalene-4,6-disulphonic acid,
1-benzoylamino-8-hydroxynaphthalene-4,6-disulphonic acid,
1-sulpho-acetylamino-8-hydroxynaphthalene-4,6-disulphonic acid,
2-amino-8-hydroxynaphthalene-sulphonic acid-6,
2-phenylamino-8-hydroxynaphthalene-sulphonic acid-6,
2-(4'-sulphophenyl)-amino-8-hydroxynaphthalene-sulphonic acid-6,
2-acetylamino-8-hydroxynaphthalene-3,6-disulphonic acid,
3-aminoacetanilide,
1-amino-3-(sulphoacetyl)-aminobenzene,
1-amino-2-methoxy-5-methylbenzene,
1-(2'-methyl-5'-sulphophenyl)-3-methylpyrazolone-5,
1-(2',5'-dichloro-4'-sulphophenyl)-3-methylpyrazolone-5,
1-(2',5'-dichloro-4'-sulphophenyl)-3-methyl-pyrazolimide-5,
(acetoacetic acid-4-sulpho)-anilide,
1-hydroxynaphthalene-4,8-disulphonic acid,
1-hydroxynaphthalene-5,7-disulphonic acid,
1-hydroxynaphthalene-3,6-disulphonic acid,
2-hydroxynaphthalene-6,8-disulphonic acid,
2-aminonaphthalene-5,7-disulphonic acid,
1-aminonaphthalene-7-sulphonic acid,
1-aminonaphthalene-6-sulphonic acid, then further diazotised and coupled in an acidic medium with 1-phenylaminonaphthalene-sulphonic acid-(8).

When the azo dyestuff still contains metallisable groupings after the introduction of the reactive radical $\{R_2\}_pX$, the reactive dyestuff can be metallised afterwards. When the employed acylating agents capable of introducing the radical $\{R_2\}_pX$ are those reactive components which contain more than two labile substituents, for instance trichlorotriazines or tri- or tetra-chloropyrimidines or 2,3-dichloroquinoxaline-6-carboxylic acid chloride or -6-sulphonic acid chloride, the excess of the labile radicals can afterwards be reacted with other suitable compounds containing an exchangeable hydrogen atom, for instance with aliphatic or aromatic amino or hydroxy compounds provided that at least one reactive radical or one reactive group remain in X.

The secondary ω-amino-alkyl group attached to the nucleus may also be present in the coupling component which is then combined with suitable diazo components to form the starting dyestuffs. For this purpose, consideration can be given first of all to those components which are formed by exchanging the hydroxy or amino group at the 2-position in 2-amino-5-hydroxynaphthalene-7-sulphonic acid, 2,5-dihydroxynaphthalene-7-sulphonic acid, 2-amino-8-hydroxynaphthalene-6-sulphonic acid or 2,8-dihydroxynaphthalene-6-sulphonic acid by the aromatic amino group of one of the above mentioned amino-N-alkyl-benzylamines which may optionally be substituted in the manner stated there. In that case, suitable diazo components are, in addition to optionally substituted aniline-sulphonic acids and naphthylamino-sulphonic acids, for instance those diazo compounds which contain a metallisable group, such as an OH—, OCH$_3$— or COOH—group at the o-position relative to the diazotisable amino group. Other suitable coupling components with a secondary ω-amino-alkyl group attached to the nucleus are for instance the appropriate derivatives of 1-phenyl-5-pyrazolones, of which the following may be mentioned:

1-(2'-sulpho-4'-ω-methylamino-methyl-phenyl)-3-methyl-pyrazolone-5,
1-(4'-sulpho-3'-ω-methylamino-methyl-phenyl)-3-methyl-pyrazolone-5 and
1-(3'-ω-methylamino-methylphenyl)-3-methyl-pyrazolone-5.

In some cases, the novel dyestuffs can also be synthesized by the method of combining the diazo components with the coupling components in a suitable manner whilst choosing the components for this purpose so that at least one of them contains a grouping

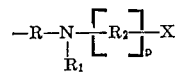

It is also possible first to build up a monoazo dyestuff of the formula

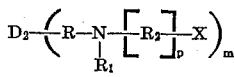

wherein $D_2$ represents a metal-free or metal-containing monoazo dyestuff which exhibits a diazotisable amino group, R denotes an alkylene group, preferably of low molecular weight, such as —$CH_2$— or

$R_1$ is the radical —$C_nH_{2n+1}$ where $n$ is an integer of 1 to 4, X is a heterocyclic reactive group, $R_2$ the bridge member —OC— or —$O_2S$—, $p$ is the number 0 or 1 and $m$ denotes an integer of 1 to 3, then to diazotise whilst the reactive group is preserved and combine it with a coupling component to form a diisazo dyestuff.

As a further modification, it is also possible to couple a dyestuff of the formula

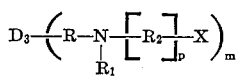

wherein $D_3$ represents the radical of a metal-free or metal-containing monoazo dyestuff which still has a position where coupling is possible and R, $R_1$, $R_2$, X, $p$ and $m$ have the above significance, with a diazo component to form a diisazo dyestuff.

The novel dyestuffs are extremely valuable products which are exceedingly suitable for a wide variety of fields of application. If they are soluble in water, they are of special interest for dyeing textile materials which contain nitrogen or which contain hydroxy groups, particularly of natural and regenerated cellulose, wool, silk, and of synthetic polyamide and polyurethane fibres.

For dyeing cellulose, the dyestuffs are preferably employed in the form of an aqueous solution which is treated with substances having an alkaline reaction, such as alkali metal hydroxides or alkali metal carbonates, or with compounds which are convertible to substance having an alkaline reaction, such as alkali metal bicarbonates. Other auxiliary agents can be added to the solution, provided that they do not have an undesirable reaction with the dyestuffs. Such additives include, for instance, surface active substances such as alkyl sulphates, or substances preventing the migration of the dyestuff, or dyeing assistants such as urea (in order to improve solubility and fixing of the dyestuffs), or inert thickeners such as oil-water emulsions, tragacanth, starch, alginate or methylcellulose.

The solutions or pastes prepared as above are applied on the material to be dyed, for instance by padding in a foularding machine (short bath) or by printing, and thereafter heated at an elevated temperature for some time, preferably at 40–150° C. Heating may be effected in a hot flue, steaming apparatus, on heated rolls or by introduction into heated concentrated solutions of salt.

When a padding or dyeing liquor without alkali is applied, this procedure is followed by a passage of the dry goods through a solution having an alkaline reaction to which common salt or Glauber's salt have been added. During this procedure the addition of salt reduces the migration of dyestuff from the fibre.

It is also possible to pretreat the material to be dyed with one of the above stated acid binding agents, subsequently to treat it with a solution or paste of the dyestuff and finally to fix it at an elevated temperature, as described above.

During the process known as pad (alkali)-batch-cold process a subsequent heating of the padded fabric can be dispensed with by storing the fabric at room temperature for 2–40 hours. During this process sodium carbonate is preferably employed as the alkali.

For dyeing from long baths, the material is introduced into an aqueous solution of the dyestuff (goods-to-liquor ratio of 1:5 to 1:40) at room temperature and it is dyed for 40–90 minutes, optionally whilst increasing the temperature up to 85° C., whilst adding salts, such as for instance sodium sulphate, by portions and thereafter adding an alkali, for instance sodium phosphate, sodium carbonate or alkali metal hydroxides.

When fixing has been completed, the goods to be dyed are hot rinsed and finally soaped, provided that the intended application of the dyed material makes this necessary, when insufficiently fixed residues of the dyestuff are removed. Dyeings with an excellent fastness to wetting are obtained, despite the fact that the dyestuffs to be preferentially applied have no affinity or only a slight affinity for the material to be dyed.

Materials containing hydroxy groups are printed by employing a printing paste of a dyestuff solution, a thickener such as sodium alginate and a compound having an alkaline reaction or forming an alkali on heating, such as sodium carbonate, sodium phosphate, potassium carbonate, potassium acetate or sodium and potassium bicarbonate, and the printed material is rinsed and, where necessary, finally soaped.

When the dyestuffs contain groupings which form metal complexes, the fastness of the dyeings and prints can sometimes be improved by an after-treatment with metal discharging agents, such as copper salts, for instance copper sulphate, or chromium, cobalt and nickel salts such as chromium acetate, cobalt sulphate or nickel sulphate.

Textile materials which contain amide groups, such as wool, silk, synthetic polyamide and polyurethane fibres, are generally dyed in accordance with the dyeing methods customary for this purpose, in an acidic to neutral range, whereupon a final increase in the pH value of the dye liquor, for instance to pH 6.5 to pH 8.5, sometimes proves to be advantageous.

The after-treatment of the dyeings, impregnations and prints obtained on fabrics from polyamide fibres preferably takes place at a temperature of 50–110° C. and lasts for 5–60 minutes. In this case, it is again sometimes possible to improve the fastness of the dyeings by treatment with metal discharging agents, such as copper salts, for instance copper sulphate, or chromium, cobalt and nickel salts, such as chromium acetate, cobalt sulphate or nickel sulphate, provided that the employed dyestuffs contain groupings capable of forming metal complexes.

Compared with many known fibre reactive dyestuffs which in place of the secondary ω-amino-alkyl group have an amino group attached to the nucleus, the novel dyestuffs are superior in respect of their better solubility in water, lower sensitivity towards salts and improved fastness to washing. Moreover, the dyeing on cellulosic material with those novel azo dyestuffs which contain the reactive group in the diazo component deserve special mention as being particularly capable of being discharged.

The following examples are given for the purpose of illustrating the invention without, however, restricting it thereto; the term "parts" denotes parts by weight if not stated otherwise.

EXAMPLE 1

9.85 parts of p-amino-benzyl-methylamine are dissolved in 100 parts by volume of ice-water by the addition of 20 parts by volume of concentrated hydrochloric acid, and a solution of 5 parts of sodium nitrite in 25 parts by volume of water is added dropwise to it. The clear solution of the diazonium salt is added dropwise at 0–5° C. to a solution of 32 parts of 1-N-sulpho-acetylamino-8-hydroxynaphthalene-4,6-disulphonic acid and 12.5 parts of sodium carbonate in 200 parts by volume of water. When coupling has been completed, the clear red solution is warmed to 35° C. and 19 parts of 2,3-dichloroquinoxaline-6-carboxylic acid chloride are added. 7.7 parts of sodium carbonate in 40 parts by volume of water are added at the rate required for the pH value to be about 7.5. The acylation is rapidly completed. Sufficient rock salt is added to form a 15% solution, and the separated dyestuff is filtered off with suction and pressed off, and it is dried at 40° C. in a vacuum drying cabinet. It corresponds to the formula stuff obtainable according to Example 2, and 0.5 g. of a nonionic wetting agent (for instance a poly-ethoxylated oleyl alcohol) as well as 150 g. of urea and 15 g. of sodium bicarbonate. The fabric is subsequently pressed off between two rubber rolls to a moisture content of about 100%. After it has been subjected to intermediate

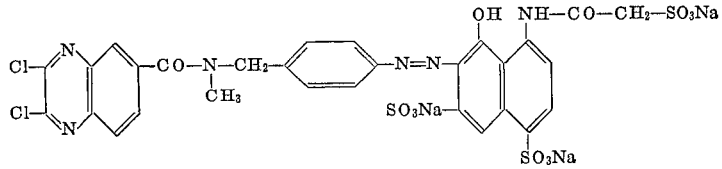

EXAMPLE 2

12.5 parts of 4-amino-2-sulpho-benzyl-methylamine are suspended in 150 parts by volume of ice water and 16 parts by volume of concentrated hydrochloric acid. 4 parts of sodium nitrite in 20 parts by volume of water are added dropwise to it. The resultant clear diazo solution is added dropwise at 0–5° C. to a solution consisting of 21 parts of 1-N-acetylamino-8-naphthol-3,6-disulphonic acid and 10 parts of sodium carbonate in 200 parts by volume of water. The resultant dark-red solution is warmed to 35° C. and 15.2 parts of 2,3-dichloroquinoxaline-6-carboxylic acid chloride are added to it. 6.15 parts of sodium carbonate in 20 parts by volume of water were added at the rate required for the pH value to be maintained between 7 and 8. Sufficient rock salt is then added in order to form a 10% solution. After filtering off with suction, pressing off and drying at 40° C., a bluish red dyestuff is obtained which corresponds to the following formula drying at 50–60° C., it is heated at 140° C. for 10 minutes and the resultant dyeing thoroughly rinsed with hot water and treated for 20 minutes with a boiling solution containing 5 g. of Marseilles soap and 2 g. of sodium carbonate per litre. After rinsing and drying, a strong bluish red shade is obtained with good wet and light fastness and a very good capacity for being discharged.

When cellulsoe fabric is printed with a printing paste which contains, per kilogram, 30 g. of the dyestuff described in Example 2, 100 g. of urea, 300 g. of water, 500 g. of alginate thickening (60 g. of sodium alginate per kilogram of thickening), 10 g. of sodium carbonate and 10 g. of the sodium salt of 3-nitrobenzene-sulphonic acid and which had been made up of 1 kilogram with water, it is subsequently subjected to intermediate drying, and is then steamed at 103–115° C. for 30 seconds in a suitable steamer, a strong bluish red shade with good fastness properties is obtained after rinsing and soaping with boiling.

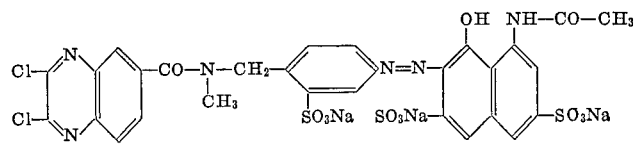

Cotton or cellulose wool fabrics are impregnated on a foularding machine at 20–25° C. with a solution which contains, per litre of liquor, 30 g. of the dyestuff described in Example 2, 100 g. of urea and 20 g. of sodium carbonate, it is pressed off to a moisture content of about 100% and the damp fabric is then rolled up again. After being allowed to stand at room temperature for 24 hours, the fabric is rinsed, soaped with boiling as usual and dried. A brilliant bluish red shade is obtained, with good fastness to wetting and light and an excellent capacity for being discharged.

Cotton or cellulose fabrics are impregnated on a foularding machine at 20–25° C. with a solution which contains, per litre of liquor, 30 g. of the dyestuff described in Example 2, 100 g. of urea and 20 g. of sodium carbonate, it is pressed off to a moisture content of about 100% and it is steamed at 103° C. for 10 minutes. After rinsing, soaping with boiling and drying, a brilliant bluish red shade is obtained with good wet and light fastness and excellent capacity for being discharged.

Coton fabric is impregnated at 20–25° C. with a solution which contains, per litre of liquor, 20 g. of the dye-

EXAMPLE 3

12.5 parts of 3-amino-4 sulpho-benzyl-N-methylamine are dissolved in 150 parts by volume of ice-water and 16 parts by volume of concentrated hydrochloric acid. 4 parts of sodium nitrite in 20 parts of volume of water are added dropwise to it. The resultant clear diazo solution is added dropwise at 30–35° C. to a solution consisting of 21.8 parts of 2-N-ureido-5-hydroxy-naphthalene-1,7-disulphonic acid and 16 parts of sodium bicarbonate in 200 parts by volume of water. Part of the dyestuff is precipitated. It is redissolved by the addition of 2000 parts by volume of water. 17.3 parts of 2,3-dichloroquinoxaline-6-sulphochloride are added at 40–45° C. The pH value is maintained between 7 and 8 by the dropwise addition of a solution of 6.15 parts of sodium carbonate. When acylation has been completed, which is recognized from the consumption of the sodium carbonate, the dyestuff is separated by means of the addition of 10% of common salt, filtered off with suction, pressed off and dried at 40° C. in a vacuum drying cabinet. The resultant orange-red dyestuff corresponds to the formula

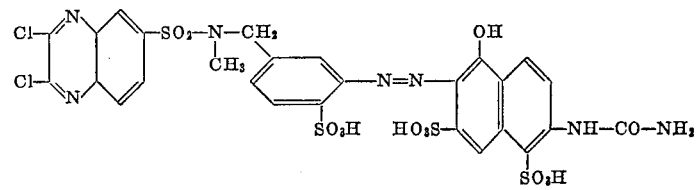

It dyes cellulose fibres to brilliant orange shades which have an excellent capacity for being discharged.

EXAMPLE 4

12.5 parts of 3-amino-4-sulpho-benzyl-N-methylamine are dissolved in 150 parts by volume of ice-water and 16 parts by volume of concentrated hydrochloric acid. 4 parts of sodium nitrite in 20 parts by volume of water are added dropwise to it. The resultant clear diazo solution is added dropwise at 30–35° C. to a solution of 19.9 parts of 2-N-benzoylamino-5-hydroxy-naphthalene-7-sulphonic acid and 16 parts of sodium bicarbonate in 200 parts by volume of water. The dyestuff is almost completely separated by the addition of 10% of common salt, and it is then filtered off with suction.

10.7 parts of cyanuric chloride are dissolved in 90 parts of acetone and added to 90 parts of ice. A solution of the dyestuff obtained in accordance with parapgraph 1 in 2500 parts by volume of ice-water is added to this suspension, and 6.15 parts of sodium carbonate in 20 parts by volume of water are added dropwise so that the pH value is that of a weakly alkaline medium.

When the reaction is completed, 10 parts of phosphate buffer are added to the solution and the dyestuff is separated by means of the addition of 200 parts of common salt. After briefly stirring at 0° C., the resultant dyestuff is filtered off with suction, pressed off and thoroughly mixed with 5 parts of phosphate buffer on the suction filter, and it is rinsed with acetone. The dyestuff corresponds to the formula

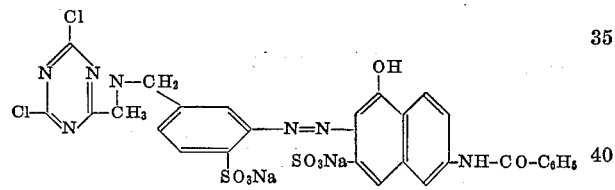

It dyes cellulose materials to brilliant orange shades, which can very easily be discharged, in accordance with one of the above mentioned processes.

(The employed phosphate buffer is a mixture of 1 part of disodium hydrogen phosphate and 1.8 parts of potassium hydrogen phosphate.)

EXAMPLE 5

The preparation of the diazo solution is carried out in accordance with the statements in Example 3 or 4. It is added at 0–5° C. to a solution which consists of 13 parts of 1-naphthol-4-sulphonic acid and 10 parts of sodium carbonate in 200 parts by volume of water. After coupling has been completed, 13 parts of 2,4-dichloropyrimidine-6-carboxylic acid chloride are added dropwise to the cold solution and the pH value is constantly maintained between 7 and 8 during this operation by the addition of a solution of 6.15 parts of sodium carbonate. The dyestuff is separated by the addition of 40 parts of common salt. It consists of a red powder and corresponds to the formula

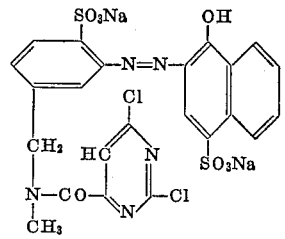

It dyes cellulose materials to brilliant scarlet shades in the presence of acid-binding agents.

EXAMPLE 6

The preparation of the diazo solution is carried out in accordance with the statements in Example 3 or 4. It is added dropwise at 30–45° C. to a solution which ocnsists 19.9 parts of 2-N-benzoylamino-5-hydroxynaphthalene-7-sulphonic acid and 16 parts of sodium bicarbonate in 200 parts by volume of water. The dyestuff is dissolved at 40–50° C. by the addition of 2000 parts by volume of water. 12.7 parts of tetrachloropyrimidine are added for acylation. The pH value is maintained between 7 and 8 by the addition of 6.15 parts of sodium carbonate. The acylated dyestuff is separated by the addition of 10% of common salt.

The dyestuff corresponds to the formula

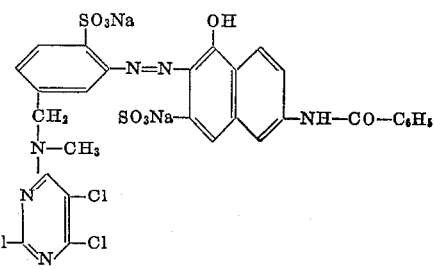

and dyes cellulose materials to clear orange shades in the presence of alkaline agents.

EXAMPLE 7

12.5 parts of 5-amino-2-sulpho-benzyl-methylamine are dissolved in 150 parts by volume of ice-water and 16 parts by volume of concentrated hydrochloric acid. The resultant clear diazo solution is added dropwise at 0–5° C. to a solution which contains 27.3 parts of the monoazo dyestuff formed by acidic coupling of 1-amino-8-hydroxy-naphthalene-3,6-disulphonic acid with diazotised p-nitro-aniline as well as 10 parts of sodium carbonate in 250 parts by volume of water. The dyestuff is separated with 20% of potassium chloride. The moist compressed filter cake is dissolved in 400 parts by volume of water at 30° C., 15.2 parts of 2,3-dicholoroquinoxaline-6-carboxylic acid chloride are added and 6.16 parts of sodium carbonate are added dropwise at the rate required to keep the pH value at 7–8. The finished acylated dyestuff is salted out by the addition of 10% of potassium chloride. It corresponds to the formula:

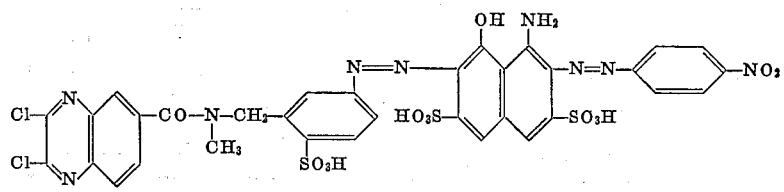

and dyes cotton to strong blue shades according to one of the above mentioned methods of application.

EXAMPLE 8

A diazo solution is prepared according to the statements of Examples 3 or 4. This is added dropwise at 30–35° C. to a solution of 16.4 parts of 2-N-ureido-5-hydroxynaphthalene-7-sulphonic acid and 16 parts of sodium bicarbonate in 200 parts by volume. The dyestuff is separated by the addition of 10% of common salt.

10.7 parts of cyanuric chloride are dissolved in 90 parts of acetone and added to 90 parts of ice. A solution of the dyestuff obtained in accordance with paragraph 1 in 2000 parts by volume of water is added to this suspension, and a solution of 6.15 parts of sodium carbonate is then added at the rate required to keep the pH value in a weakly alkaline range. The temperature should not exceed 5° C. When the sodium carbonate has been consumed, it is warmed to 35° C. and 10 parts of m-sulphanilic acid added to the solution, the pH value being maintained between 5 and 7 by the addition of 3.08 parts of sodium carbonate. The dyestuff is salted out with 15% of common salt. It corresponds to the formula:

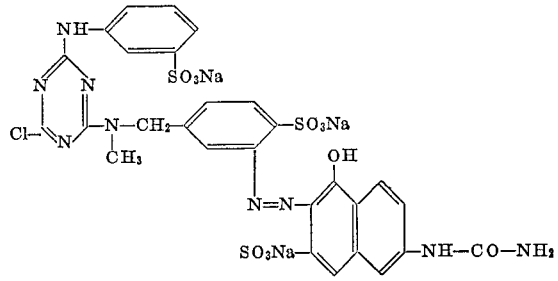

It dyes cotton to brilliant orange shades which have good fastness to light and washing and excellent capacity for being discharged, according to one of the processes of application suitable for reactive dyestuffs. When in this dyestuff the condensation product of cyanuric chloride and m-sulphanilic acid is replaced by methyl-dichlorotriazine, a dyestuff with similar properties is obtained.

The following table lists further reactive dyestuffs with good solubility, which are obtained in accordance with the statements of the previous examples but with the use of the specified components and under the coupling and acylation conditions appropriate to these components.

We claim:
1. A dyestuff of the formula

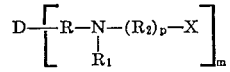

wherein D stands for the residue of an azo dyestuff selected from the class consisting of a mono- and disazo dyestuff, R stands for an alkylene radical being attached to a nucleus of D, $R_1$ stands for the residue $-C_nH_{2n+1}$ wherein $n$ stands for an integer ranging from 1 to 4, $R_2$ stands for a member selected from the class consisting of $-OC-$ and $-O_2S-$, $p$ is the number 1, $m$ is an integer ranging from 1 to 3, and X stands for a member selected from the class consisting of 2,3-dichloroquinoxalin-yl-6, 2-monochloroquinoxalin-yl-6, and 3-monochloroquinoxalin-yl-6.

2. The dyestuff of the formula

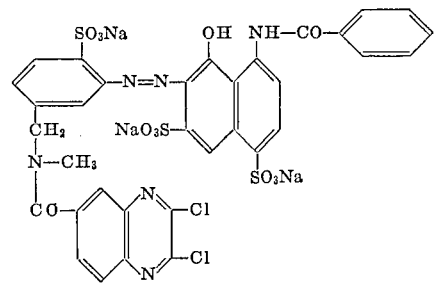

3. The dyestuff of the formula

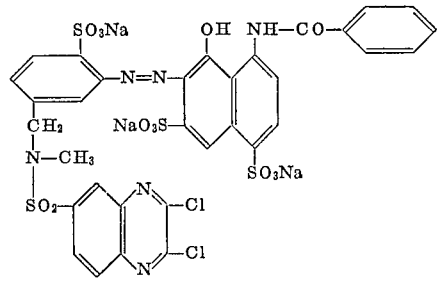

| Diazo component | Coupling component | Reactive group | Colour shade |
| --- | --- | --- | --- |
| 1-amino-3-benzyl-N-methylamine | 1-naphthol sulphonic acid-4,8 | 2,3-dichloroquinoxaline-6-carboxylic acid chloride. | Yellowish red. |
| 4-sulpho-3-amino-1-benzyl-N-methylamine | 1-N-acetylamino-8-naphthol-3,6-disulphonic acid. | do | Bluish red. |
| 2-sulpho-5-amino-1-benzyl-N-methylamine | do | do | Do. |
| 3-sulpho-5-amino-1-benzyl-N-methylamine | do | do | Do. |
| 2-sulpho-4-amino-1-benzyl-N-methylamine | do | do | Do. |
| 4-sulpho-3-amino-1-benzyl-N-methylamine | 1-N-benzoylamino-8-naphthol-3,6-disulphonic acid. | do | Do. |
| 2-sulpho-5-amino-1-benzyl-N-methylamine | do | do | Do. |
| 3-sulpho-5-amino-1-benzyl-N-methylamine | do | do | Do. |
| 2-sulpho-4-amino-1-benzyl-N-methylamine | do | do | Do. |
| 4-sulpho-3-amino-1-benzyl-N-methylamine | 1-N-benzoylamino-8-naphthol-4,6-disulphonic acid. | do | Red. |
| 2-sulpho-3-amino-1-benzyl-N-methylamine | do | do | Red. |
| 3-sulpho-3-amino-1-benzyl-N-methylamine | do | do | Red. |
| 2-sulpho-3-amino-1-benzyl-N-methylamine | do | do | Red. |
| 4-sulpho-3-amino-1-benzyl-N-methylamine | 1-N-acetylamino-8-naphthol-4,6-disulphonic acid. | do | Red. |
| 2-sulpho-3-amino-1-benzyl-N-methylamine | do | do | Red. |
| 3-sulpho-3-amino-1-benzyl-N-methylamine | do | do | Red. |
| 2-sulpho-3-amino-1-benzyl-N-methylamine | do | do | Red. |
| 4-sulpho-3-amino-1-benzyl-N-methylamine | 2-N-acetylamino-5-naphthol-1,7-disulphonic acid. | do | Orange. |
| Do | 2-N-acetylamino-5-naphthol-7-sulphonic acid. | do | Do. |
| Do | 2-N-ureido-5-naphthol-7-sulphonic acid | 2,3-dichloroquinoxaline-6-sulphochloride | Do. |
| Do | 2-N-benzoylamino-5-naphthol-1,7-disulphonic acid. | do | Do. |
| Do | 1-naphthol-4,8-disulphonic acid | do | Scarlet. |

4. The dyestuff of the formula
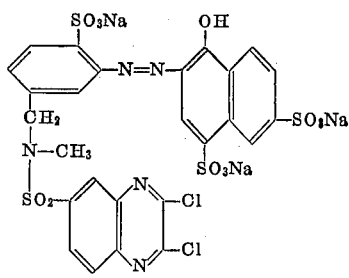
5. The dyestuff of the formula
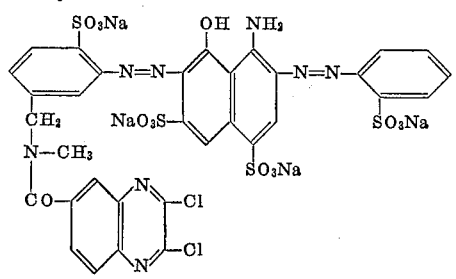
6. The dyestuff of the formula
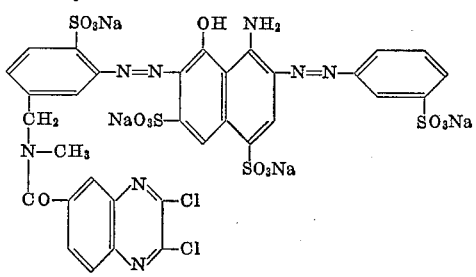
7. The dyestuff of the formula
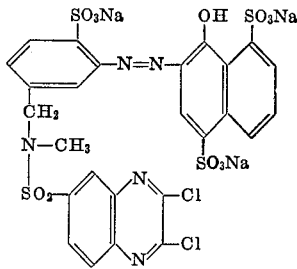
8. The dyestuff of the formula
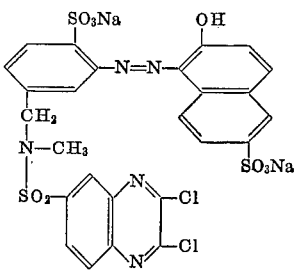
References Cited
UNITED STATES PATENTS
3,184,282   5/1965   Cole et al. _____ 260—146 X
3,184,283   5/1965   Cole et al. _____ 260—154 X
3,184,284   5/1965   Kissa _____ 260—146 X
FOREIGN PATENTS
1,319,429   1/1963   France.
CHARLES B. PARKER, *Primary Examiner.*
JOSEPH P. BRUST, *Examiner.*
F. D. HIGEL, *Assistant Examiner.*